United States Patent
Seifert

(10) Patent No.: US 8,446,669 B2
(45) Date of Patent: May 21, 2013

(54) APPARATUS FOR ADJUSTING A MICROSCOPE STAGE

(75) Inventor: Roland Seifert, Heidelberg (DE)

(73) Assignee: Leica Microsystems CMS GmbH, Wetzlar (DE)

(*) Notice: Subject to any disclaimer, the term of this patent is extended or adjusted under 35 U.S.C. 154(b) by 292 days.

(21) Appl. No.: 12/088,617

(22) PCT Filed: Sep. 25, 2006

(86) PCT No.: PCT/EP2006/066685
§ 371 (c)(1),
(2), (4) Date: Sep. 8, 2008

(87) PCT Pub. No.: WO2007/036503
PCT Pub. Date: Apr. 5, 2007

(65) Prior Publication Data
US 2009/0034066 A1   Feb. 5, 2009

(30) Foreign Application Priority Data
Sep. 28, 2005   (DE) .......................... 10 2005 046 244

(51) Int. Cl.
*G02B 21/26* (2006.01)
(52) U.S. Cl.
USPC .......................................... 359/392; 359/393
(58) Field of Classification Search
USPC .................................................. 359/391–393
See application file for complete search history.

(56) References Cited

U.S. PATENT DOCUMENTS

| 2,148,908 | A | * | 2/1939 | Lory | 359/393 |
| 2,669,158 | A | * | 2/1954 | Frischmann | 359/392 |
| 3,180,161 | A |   | 4/1965 | Wasner | |
| 3,428,387 | A | * | 2/1969 | Chambers et al. | 359/393 |
| 3,575,486 | A | * | 4/1971 | De Posada et al. | 359/393 |
| 4,012,112 | A |   | 3/1977 | Masterson | |
| 4,552,033 | A | * | 11/1985 | Marzhauser | 74/490.13 |
| 4,704,013 | A | * | 11/1987 | Clark | 359/383 |
| 5,790,308 | A |   | 8/1998 | Kamentsky | |
| 5,802,925 | A |   | 9/1998 | Kanao et al. | |
| 5,825,531 | A | * | 10/1998 | Otomo | 359/368 |
| 6,047,613 | A | * | 4/2000 | Kragolnik | 74/490.13 |
| 6,137,627 | A |   | 10/2000 | Engelhardt et al. | |

FOREIGN PATENT DOCUMENTS

| DE | 1 853 383 U | 6/1962 |
| DE | 1186237 | 1/1965 |
| DE | 26 37 533 A1 | 3/1977 |
| DE | 35 14 431 A1 | 1/1986 |

(Continued)

OTHER PUBLICATIONS

Richter, O., v. Voss, R., "Bauelemente der Feinmechanik" (Precision Engineering Components), puvlished by Technik GmbH Berlin NW7, fourth edition, pp. 352-355.

(Continued)

*Primary Examiner* — Frank Font
(74) *Attorney, Agent, or Firm* — Leydig, Voit & Mayer, Ltd.

(57) ABSTRACT

An apparatus for adjusting a microscope stage. The microscope stage of the apparatus defines a plane on which an object to be examined can be placed. The apparatus further includes a first shaft and a second shaft rotationally coupled to the first shaft. The microscope stage is guided between the first and second shafts such that a rotational movement of at least one of the first and second shafts has a direct effect on the microscope stage.

11 Claims, 4 Drawing Sheets

FOREIGN PATENT DOCUMENTS

| | | |
|---|---|---|
| DE | 36 38 543 A1 | 11/1987 |
| DE | 4019859 | 1/1992 |
| DE | 19650392 | 2/1998 |
| DE | 19924709 | 12/2000 |

OTHER PUBLICATIONS

Office Action for DE 10 2005 046 244.8 mailed Dec. 16, 2010.

* cited by examiner

US 8,446,669 B2

APPARATUS FOR ADJUSTING A MICROSCOPE STAGE

CROSS REFERENCE TO PRIOR APPLICATION

This is a U.S. national phase application under 35 U.S.C. §371 of International Patent Application No. PCT/EP2006/066685, filed Sep. 25, 2006, and claims benefit of German Patent Application No. 10 2005 046 244.8, filed Sep. 28, 2005, which is incorporated by reference herein. The International Application was published in German on Apr. 5, 2007 as WO 2007/036503 A1 under PCT Article 21(2).

FIELD

The invention relates to an apparatus for adjusting a microscope stage.

BACKGROUND

German patent specification DE 196 50 392 C2 describes a fine-focussing stage for a microscope. The fine-focussing stage comprises an object plate carrying the object. The distance of the object plate from the object can be adjusted, without any tilting with respect to the objective axis, using a parallel lifter. The parallel lifter is carried by a carrying part which is connected to the microscope. Flexible connecting parts are provided between the carrying part and the object plate, which ensures that the object plate can be adjusted. The flexible connecting parts extend parallel to the plane of the object plate. The connecting elements between the carrying part and the object plate are in the form of a parallelogram lifter. The drive for the adjustment of the object plate acts directly on the object plate. The drive is a galvanometer drive which transmits, via a cable, the movement to the object plate.

German patent specification DE 199 24 709 B1-describes an apparatus for fine-positioning of a component. Here, a drive acts on a control lever which in turn acts on a first and a second actuating lever. The first and the second actuating lever are in each case connected to a rotating part. The rotating parts are connected, via a rolling element, to the component to be adjusted. Rolling the rolling elements on the rotating parts changes the position, which causes a lifting movement of the component.

SUMMARY

In accordance with one aspect of the present invention, an apparatus for adjusting a microscope stage is provided. The microscope stage of the apparatus defines a plane on which an object to be examined can be placed. The apparatus further includes a first shaft and a second shaft rotationally coupled to the first shaft. The microscope stage is guided between the first and second shafts such that a rotational movement of at least one of the first and second shafts has a direct effect on the microscope stage.

BRIEF DESCRIPTION OF THE DRAWINGS

The drawing schematically illustrates the subject of the invention, which will be described below with reference to the figures. In the figures.

DETAILED DESCRIPTION

The present invention provides an apparatus for adjusting a microscope stage, which can be used to raise a microscope stage quickly and reliably to a position and to lower it from a position. These and other advantages can be achieved by an apparatus comprising the features described below.

The apparatus for adjusting a microscope stage includes microscope stage which defines a plane on which an object to be examined is placed. The microscope stage is guided between two shafts which are coupled in terms of their rotational movement, with the rotational movement having a direct effect on the microscope stage.

The rotational movement of the shafts can be transmitted to the microscope stage in various ways. Transmission by means of friction (rubber wheel), toothed wheel—toothed rod, cable or belt, or a gearbox etc.

Figure 1:
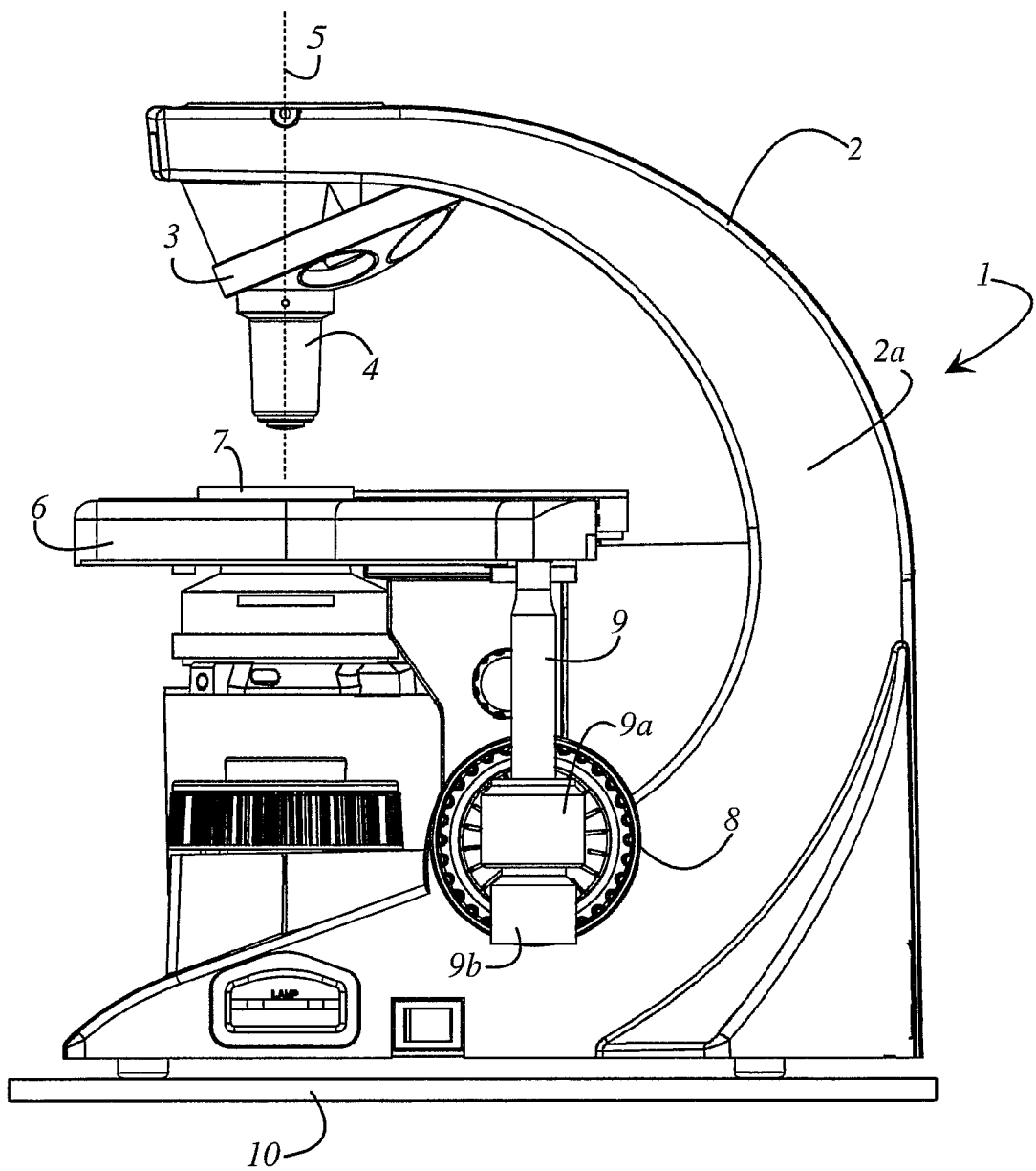
FIG. 1 shows a side view of a microscope with a height-adjustable microscope stage.

FIG. 1 shows a side view of a microscope 1, which illustrates an embodiment—of the invention. The microscope 1 comprises a microscope stand 2. The microscope 1 is placed on a base plate 10. Furthermore a revolver 3 carrying at least one objective 4 is provided on the microscope stand 2. The objective 4 can be pivoted by means of the revolver 3 to a working position. The objective 4 has an optical axis 5 which is perpendicular to a microscope stage 6 when the objective 4 is in the working position. An object 7 to be examined can be placed on the microscope stage 6. The microscope stage 6 can be adjusted parallel to the optical axis 5 of the microscope using an apparatus for adjusting a microscope stage in order to focus on the object 7. The apparatus for adjusting the microscope stage can be driven via two operating elements 8 (the side view in FIG. 1 shows only one operating element 8). The operating elements 8 are provided on both side walls 2a and 2b of the microscope stand 2. These operating elements 8 can be used by a user to adjust the microscope stage 6 with the aid of the apparatus in the direction of the optical axis 5. Adjusting the microscope stage 6 leads to focussing of the object 7 which is located on the microscope stage 6. An adjustment element 9 for the microscope stage 6 is positioned directly in front of the operating element 8. The adjustment element 9 is connected to the microscope stage 6 and permits the microscope stage 6 to be adjusted perpendicular to the optical axis 5, by means of which the object 7 can be positioned in the imaging field of the objective 4. The adjustment element 9 comprises an X-element 9a which enables the adjustment of the microscope stage 6 in the X-direction. The adjustment element 9 further comprises a Y-element 9b which enables the adjustment of the microscope stage 6 in the Y-direction.

Figure 2:
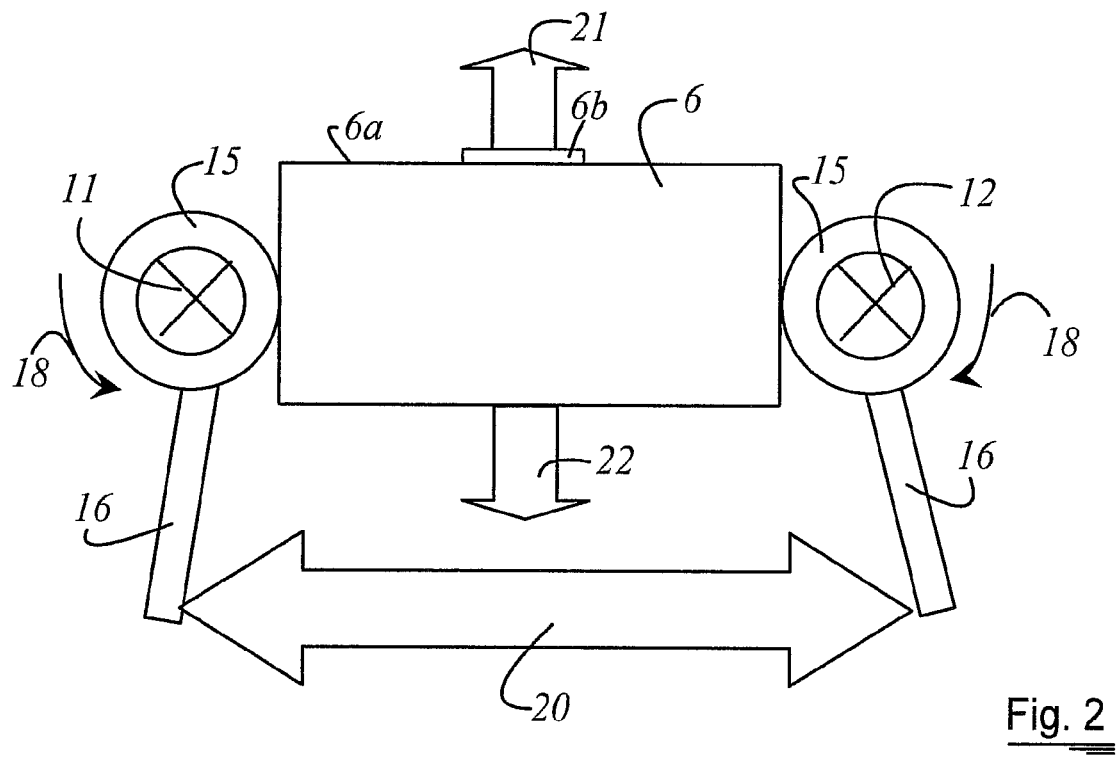
FIG. 2 shows a schematic of the operative connection between the microscope stage and the apparatus for adjusting the microscope stage.

FIG. 2 shows a schematic of the operative connection between the microscope stage 6 and the apparatus for adjusting a microscope stage in accordance with an embodiment of the present invention. The apparatus for adjusting a microscope stage is designed such that the microscope stage 6 is guided between two shafts 11 and 12 which are coupled in terms of their rotational movement. In this case, the shafts 11 and 12 are arranged such that, when the shafts 11 and 12 rotate, they have a direct effect on the microscope stage 6. The shafts 11 and 12 can, for example, be provided with a rubber coating 15 so that the movement of the shafts 11 and 12 can be transmitted by means of friction. Other movement transmissions are conceivable and are sufficiently known to the person skilled in the art. A drive 20 is provided for moving the shafts 11 and 12, the drive 20 being arranged such that the rotational movement 18 of the shafts 11 and 12 is coupled. In the embodiment illustrated here, both shafts 11 and 12 are provided with a control element 16, on which the drive 20 acts simultaneously and thus couples the movement of the two shafts 11 and 12. As can be seen from the illustration in FIG. 3, the rotational movement 18 of the shafts 11 and 12 is effected in mutually opposing directions in order to thereby raise 21 and/or lower 22 the microscope stage 6. The control element 16 is used to convert the movement of the drive 20 to a rotational movement 18 of the shafts 11 and 12. The microscope stage 6 defines a plane 6a on which an object 6b to be examined is placed.

Figure 3:
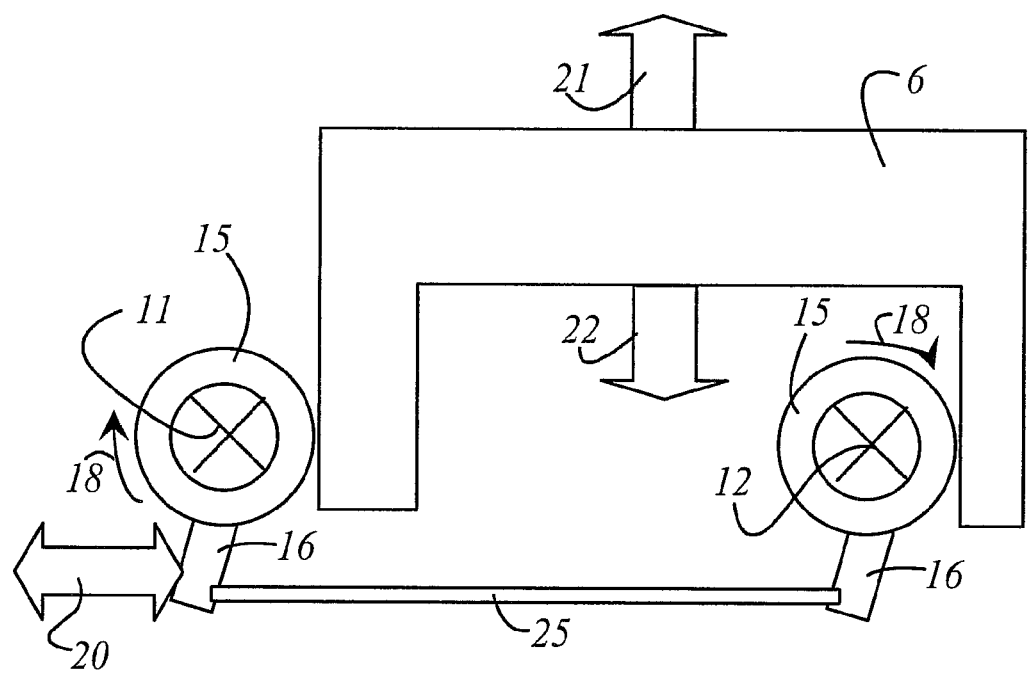
FIG. 3 shows another schematic of the operative connection between the microscope stage and the apparatus for adjusting the microscope stage.

FIG. 3 shows another schematic of the operative connection between the microscope stage 6 and the apparatus for adjusting a microscope stage. The drive 20 merely also acts on a control element 16 which is connected to the shaft 11. The movement of the drive 20 is transmitted, via a stiff coupling 25, to the control element 16 which is connected to the second shaft 12. The rotational movement 18 of the coupled shafts 11 and 12 is effected in the same direction.

Figure 4:
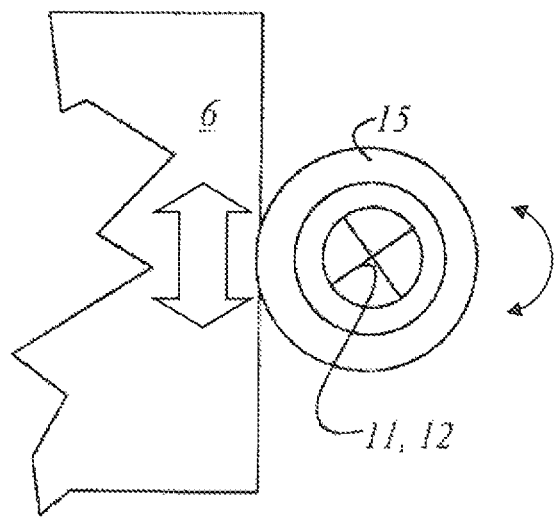
FIG. 4 shows a schematic of a detail of the operative connection of the shafts for the microscope stage adjustment and the microscope stage.

FIG. 4 shows a schematic in accordance with one aspect of the present invention of a detail of the interaction of one of the shafts 11 or 12 for the adjustment of the microscope stage and the microscope stage 6. A rubber wheel 15 or a friction element which is used to transmit the rotational movement of the shaft 11 or 12 to the microscope stage 6 is attached on the shaft 11 or 12.

Figure 5:
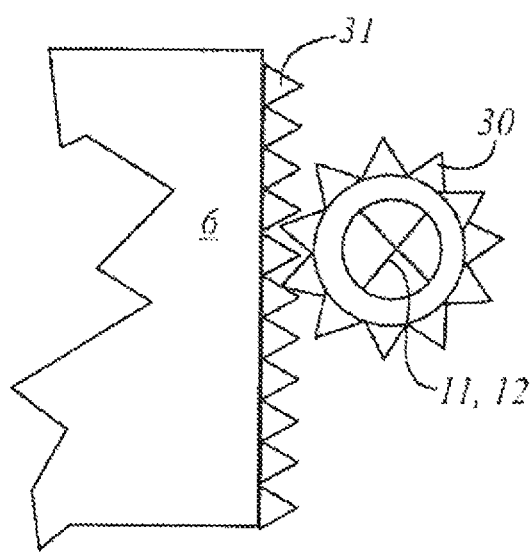
FIG. 5 shows another embodiment of the operative connection of the shafts for the microscope stage adjustment and the microscope stage.

FIG. 5 shows a further embodiment of the interaction of one of the shafts 11 or 12 for the adjustment of a microscope stage and the microscope stage 6. The rotational movement of both shafts 11 or 12 is in each case transmitted to the microscope stage 6 by means of a toothed wheel 30 which interacts with a corresponding toothed rod 31 on the microscope stage 6.

Figure 6:
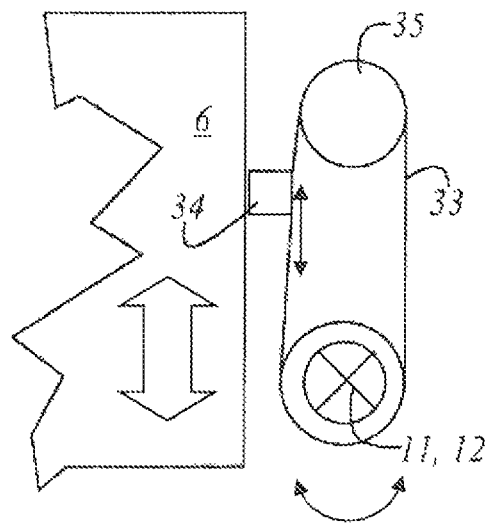
FIG. 6 shows another embodiment of the operative connection of the shafts for the microscope stage adjustment and the microscope stage.

FIG. 6 shows yet a further embodiment of the interaction of one of the shafts 11 or 12 for the adjustment of a microscope stage 6. The rotational movement of both shafts 11 or 12 is in each case transmitted to the microscope stage 6 by means of a cable 33 or a belt. The cable 33 is guided over a deflection roll 35 and connected to the microscope stage 6 by means of an attachment 34.

Figure 7:
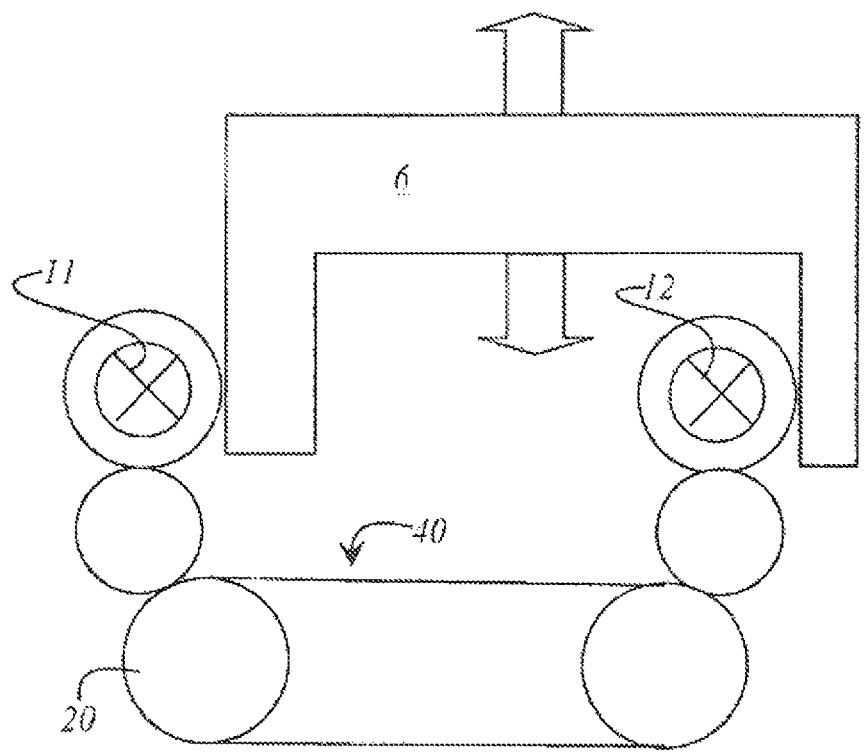
FIG. 7 shows an embodiment of the coupling of the shafts for the adjustment of the microscope stage.

FIG. 7 shows another embodiment of the coupling of the shafts 11 and 12 for the adjustment of the microscope stage 6. The rotational movement of both shafts 11 or 12 is in each case transmitted to the microscope stage 6 in the form illustrated here by means of friction. The shafts 11 and 12 are coupled to one another via a transmission 40. The accuracy of the lift height is given by the drive 20 and its transmission ratio by the transmission 40.

The apparatus according to the invention also makes it possible for a microscope stage to be raised and lowered in the direction of the optical axis 5 quickly, reproducibly and without tilting.

The invention claimed is:

1. An apparatus for adjusting a microscope stage, the microscope stage defining a plane on which an object to be examined can be placed, the apparatus comprising:
   a first shaft coupled to a first portion of the microscope stage so as to mechanically transmit a movement of the first shaft to the microscope stage; and
   a second shaft rotationally coupled to the first shaft and coupled to a second portion of the microscope stage so as to mechanically transmit a movement of the second shaft to the microscope stage;
   wherein the microscope stage is guided between the first and second shafts by a rotational movement of the first and second shafts.

2. The apparatus of claim 1, wherein the rotational movement of the first and second shafts is transmittable to the microscope stage by static friction.

3. An apparatus for adjusting a microscope stage, the microscope stage defining a plane on which an object to be examined can be placed, the apparatus comprising:
   a first shaft coupled to the microscope stage so as to mechanically transmit a movement of the first shaft to the microscope stage;
   a second shaft rotationally coupled to the first shaft and coupled to the microscope stage so as to mechanically transmit a movement of the second shaft to the microscope stage, the microscope stage being guided between the first and second shafts by a rotational movement of the first and second shafts, the rotational movement being transmittable to the microscope stage by static friction; and
   a first and second rubber wheel, the first rubber wheel operatively connected to one of the first and second shafts and the second rubber wheel operatively connected to the other of the first and second shafts, wherein the microscope stage is seated on the first and second rubber wheels so as to transmit the static friction.

4. An apparatus for adjusting a microscope stage, the microscope stage defining a plane on which an object to be examined can be placed, the apparatus comprising:
   a first shaft coupled to the microscope stage so as to mechanically transmit a movement of the first shaft to the microscope stage;
   a second shaft rotationally coupled to the first shaft and coupled to the microscope stage so as to mechanically transmit a movement of the second shaft to the microscope stage, the microscope stage being guided between the first and second shafts by a rotational movement of the first and second shafts,
   a first and second toothed wheel, the first toothed wheel operatively connected to one of the first and second shafts and the second toothed wheel operatively connected to the other of the first and second shafts; and
   a first and second toothed rod, each rod coupled the microscope stage and configured to engage a respective one of the first and second toothed wheel such that the rotational movement of the at least one of the first and second shafts is transmitted to the microscope stage.

5. The apparatus of claim 1, further comprising at least one of a cable and a belt corresponding to each of the first and second shafts, each of the at least one of the cable and the belt configured to transmit the rotational movement of the respective shaft to the microscope stage.

6. The apparatus of claim 1, wherein the first and second shafts are coupled to one another by friction.

7. The apparatus of claim 1, wherein the first and second shafts are coupled to one another by at least one toothed wheel.

8. The apparatus of claim 1, wherein the first and second shafts are coupled to one another by at least one of a cable and a belt.

9. The apparatus of claim 1, further comprising a drive coupled to at least one of the first and second shafts.

10. The apparatus of claim 9, wherein the drive is at least one of linear and rotational.

11. The apparatus as claimed in claim 9, further comprising a transmission coupled to the drive.

* * * * *